J. F. O'CONNOR.
SIDE BEARING FOR RAILWAY CARS.
APPLICATION FILED MAR. 1, 1916.
1,206,026.
Patented Nov. 28, 1916.
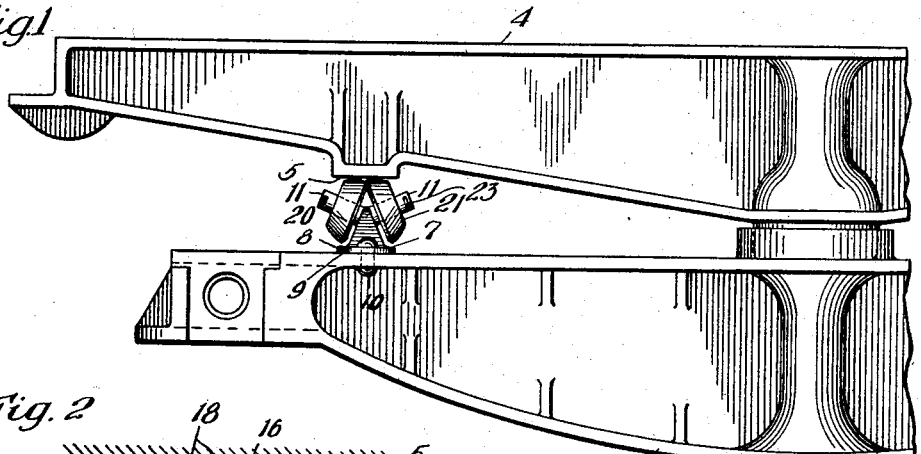
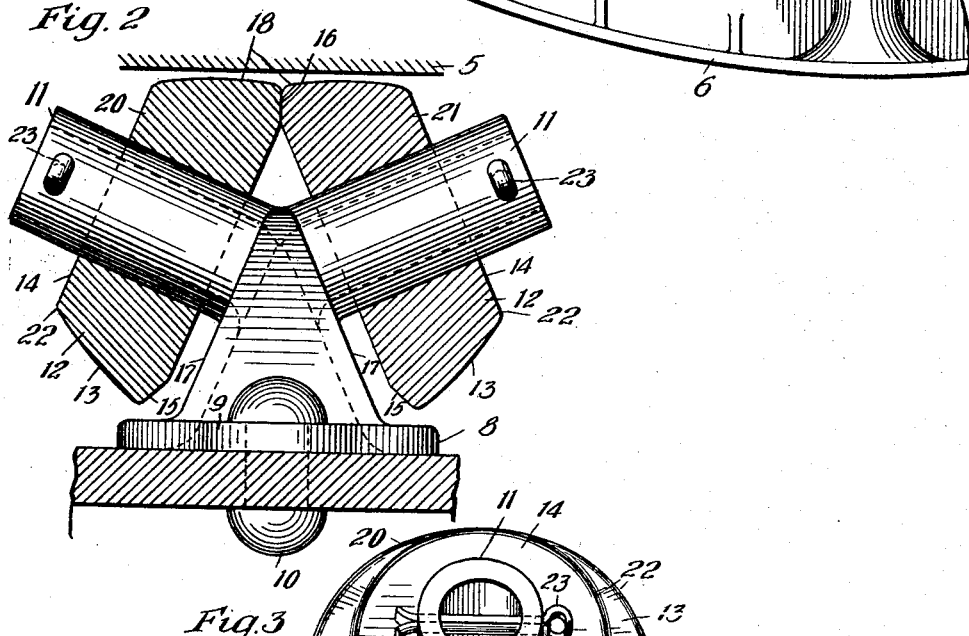
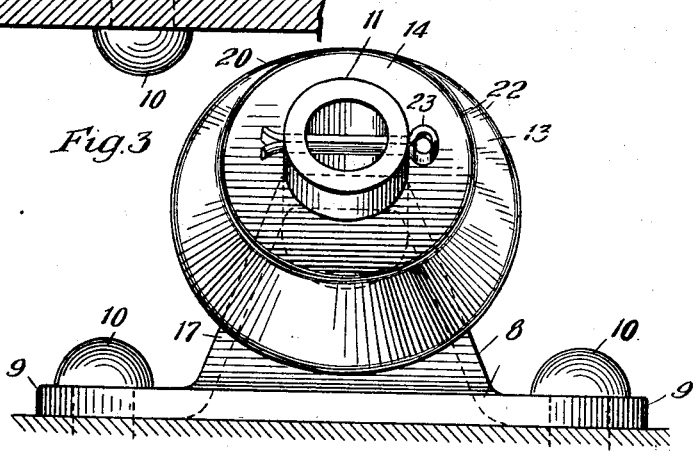
WITNESS
Wm. Geiger
INVENTOR.
John F. O'Connor
BY George D. Haight
ATTORNEY

UNITED STATES PATENT OFFICE.

JOHN F. O'CONNOR, OF CHICAGO, ILLINOIS, ASSIGNOR TO WILLIAM H. MINER, OF CHAZY, NEW YORK.

SIDE BEARING FOR RAILWAY-CARS.

1,206,026.

Specification of Letters Patent.   Patented Nov. 28, 1916.

Application filed March 1, 1916.   Serial No. 81,326.

*To all whom it may concern:*

Be it known that I, JOHN F. O'CONNOR, a citizen of the United States, residing at Chicago, in the county of Cook and State of Illinois, have invented a certain new and useful Improvement in Side Bearings for Railway-Cars, of which the following is a full, clear, concise, and exact description, reference being had to the accompanying drawings, forming a part of this specification.

My invention relates to improvements in side bearings for railway cars.

The object of my invention is to provide a simple and efficient roller side bearing.

In the drawings forming a part of this specification, Figure 1 is an end view of my improved side bearing shown mounted between a truck-bolster and a body-bolster, substantially one-half of each of the bolsters being shown in the drawing. Fig. 2 is an enlarged end view partly in transverse section. Fig. 3 is an end view of one of the rollers in its mounted position.

Referring to the drawings, the numeral 4 indicates a truck-bolster (substantially one-half thereof being shown in the drawing) having bearing face 5 for the side bearing provided thereon. The numeral 6 indicates a truck-bolster (substantially one-half thereof being shown in the drawing) upon which is mounted the side bearing 7. The side bearing consists of a base member 8 provided with suitable flanges 9 by means of which the same is attached to the bolster in a suitable manner as by the rivets 10, the said base member being also provided with the outwardly and upwardly extended trunnion members 11—11, each of which bears a suitable roller 12.

In the specific form of my invention as shown in the drawings, the base member 8 and the trunnion members 11 are integral and cast hollow, as shown by the dotted lines in Fig. 2. The rollers 12 are each provided with a bearing face 13, the said face upon each of the rollers being beveled outwardly or toward their front faces 14, as clearly shown in Fig. 2. At their backs the rollers are each provided with a bevel as at 15 to permit their engagement with each other as illustrated at the numeral 16 in Fig. 2. When in normal position, the rollers are each suitably spaced from the adjacent face 17 of the base member 8, and the faces opposed to the upper bearing plate 5 are in the same plane, as clearly illustrated at 18 in Fig. 2. On relative movement of the truck and body-bolster, and assuming a perfect relative movement of the two bolsters, the bearing plate would move upon the rollers with a substantially equal distribution of pressure through each; but in cases where an error occurs in the relative relation of the truck and body-bolsters, as, for instance, in the camber thereof, the rollers will automatically adjust themselves in that the outer roller 20 may move inwardly and the inner roller 21 may move outwardly in reference to the base member 8, and vice versa, the lateral movement of the rollers lifting the bearing face of the one moving away from the base member, and depressing the bearing face of the one moving toward the base member, so that the error in the camber of the bolster, or a similar departure from the normal, will not render the whole side bearing ineffective. In preferable construction, the edges of the rollers are slightly rounded, as shown at the numerals 22—22.

It will be noted that should the bearing plate engage the outer roller at its outer edge, the roller will be in its movement forced inwardly toward the base member or the inner end of its trunnion, and that in this movement it will, through its engagement against the other or inner roller, force the same outwardly upon its trunnion in reference to the base member, thereby elevating the same until it comes in engagement with the bearing plate, whereupon the pressure of the bearing plate would be distributed through both rollers to the base member and the bolster, and a wide bearing between the rollers and the bearing plate is secured under all relative positions of the two bolsters. The cotters 23 are employed to prevent extreme outward movement of the rollers upon the trunnions, and serve as retaining members.

I claim:

1. A side bearing for railway cars comprising a base member having upwardly and outwardly extended trunnions and rollers mounted on said trunnions.

2. In a side bearing for railway cars, the combination with a bearing plate, of rollers adapted to engage said plate and a base member having outwardly and upwardly extended trunnions supporting the rollers.

3. In a side bearing for railway cars, the combination with a bearing plate, of rollers adapted to engage the same, and a base member supporting said rollers, the said rollers engaging each other near the bearing plate and being separated from each other opposite the bearing plate.

4. In a side bearing for railway cars, a bearing plate, a base member having trunnions thereon, rollers upon said trunnions, the rollers having longitudinal movement on the said trunnions whereby the plane of the bearing face of the rollers as a whole will adjust itself to changes in the plane of the bearing plate.

5. In a side bearing for railway cars, a base member, upwardly and outwardly extended trunnions thereon, a roller on each of said trunnions, a bearing plate adapted to engage the rollers, the rollers having bevel edges in the same plane when in normal position, the said rollers being each longitudinally movable upon its trunnion.

6. In a side bearing for railway cars, in combination: a bearing plate, a base member, outwardly and upwardly extended trunnions upon said base member, a roller upon each of said trunnions, the said rollers engaging each other at one side of their axis, and separated from each other upon the other side of their axis, the said rollers in normal position being spaced on their trunnions from the base member, and each having longitudinal movement in either direction from its normal position upon its trunnion.

7. In a side bearing for railway cars, in combination: a bearing plate, a base member having upwardly and outwardly extended trunnions thereon, a roller upon each of said trunnions, each of said rollers being beveled toward the outer end of its trunnion, the said rollers having longitudinal movement in either direction upon their trunnions and engaging each other on one side of their axis only.

8. In a side bearing for railway cars the combination with a base member having outwardly extended trunnions, of a bearing plate and rollers upon said trunnions to engage said plate, the said rollers having longitudinal movement upon their trunnions whereby the plane of their bearing face as a whole changes upon their longitudinal movement upon the trunnions.

9. In a side bearing for railway cars the combination with truck and body bolsters, of a bearing plate secured to one of said bolsters and a base member secured to the other of said bolsters, the base member being provided with trunnions and rollers mounted upon said trunions, the said trunnions being angularly disposed in reference to the bolster to which the base member is secured, the rollers having longitudinal movement upon their trunnions and when moving together in either direction elevating the bearing face of one roller and depressing the bearing face of the other roller in reference to the opposed bolster.

In witness that I claim the foregoing I have hereunto subscribed my name this 16th day of February, 1916.

JOHN F. O'CONNOR.

Copies of this patent may be obtained for five cents each, by addressing the "Commissioner of Patents, Washington, D. C."